(12) United States Patent
Kommrusch et al.

(10) Patent No.: US 6,556,315 B1
(45) Date of Patent: Apr. 29, 2003

(54) DIGITAL IMAGE SCANNER WITH COMPENSATION FOR MISALIGNMENT OF PHOTOSENSOR ARRAY SEGMENTS

(75) Inventors: Steven J Kommrusch, Ft Collins, CO (US); Randy T Crane, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/365,112

(22) Filed: Jul. 30, 1999

(51) Int. Cl.$^7$ .............................................. H04N 1/024
(52) U.S. Cl. ...................................... 358/473; 358/444
(58) Field of Search ............................... 358/473, 474, 358/444, 472; 382/313, 312; 250/208.1, 214 R

(56) References Cited

U.S. PATENT DOCUMENTS

| | | | |
|---|---|---|---|
| 5,578,813 A | 11/1996 | Allen et al. | 250/208.1 |
| 5,619,345 A | 4/1997 | Machida et al. | 358/482 |
| 5,644,139 A | 7/1997 | Allen et al. | 250/557 |
| 5,729,008 A | 3/1998 | Blalock et al. | 250/208.1 |
| 6,207,945 B1 * | 3/2001 | Bohn et al. | 250/208.1 |
| 6,242,731 B1 * | 6/2001 | Bohn | 250/208.1 |
| 6,346,699 B1 * | 2/2002 | Bohn et al. | 250/214 R |

FOREIGN PATENT DOCUMENTS

JP 02001053939 A * 2/2001

OTHER PUBLICATIONS

Hewlett–Packard Co., "Digital Image Scanner With Optical Sensor Segments . . . ", Derwent–Acc–No: 2002–063779, 1999.*
"Modern Image Processing: Warping, Morphing, and Classical Techniques" Christopher D. Watkins, Alberto Sadum, Stephen Marenka Academic Press Professional, A Division of Harcourt Brace & Company, Boston, MA 1993.

* cited by examiner

Primary Examiner—Cheukfan Lee
(74) Attorney, Agent, or Firm—Augustus W. Winfield

(57) ABSTRACT

A segmented photosensor array for an image scanner has segments with imperfect alignment. During scanner manufacturing, photosensor segment alignment data, such as segment position offset and segment angle, is measured. The offset and angle are stored in non-volatile memory within the scanner. A position correction system uses the stored alignment data to correct position and angle values before being processed by a rectification system. Most pixels require simple geometry calculations. However, a more complex state machine is needed to handle the transition from one photosensor segment to the next. Correcting for segment position offset and angle errors enables a cost reduction for the sensor array and, in particular, reduces costs associated with scrap.

10 Claims, 11 Drawing Sheets

DIGITAL IMAGE SCANNER WITH COMPENSATION FOR MISALIGNMENT OF PHOTOSENSOR ARRAY SEGMENTS

FIELD OF INVENTION

This invention relates generally to digital image scanning and more specifically to image scanners having segmented photosensor arrays.

BACKGROUND OF THE INVENTION

Image scanners convert a visible image on a document or photograph, or an image in a transparent medium, into an electronic form suitable for copying, storing or processing by a computer. Reflective image scanners typically have a controlled source of light, and light is reflected off the surface of a document, through an optics system, and onto an array of photosensitive devices. The photosensitive devices convert received light intensity into an electronic signal. Some imaging devices, for example digital cameras, have a two-dimensional photosensor array. Other imaging devices have a one-dimensional photosensor array, and the overall image is formed one raster line at a time by providing relative movement between the object being scanned and the photosensor array. In some scanners, light from an object being scanned is reduced by the optics system onto a photosensor array having a length that is quite small relative to the width of the object being scanned. Small photosensor arrays may be fabricated as a single integrated device. In other scanners, the object is focused onto an array of photosensors using optics having a one-to-one magnification, so that the length of the photosensor array is the same as the width of the object being scanned. These relatively long arrays are typically manufactured by assembling multiple segments. Segments may abut end-to-end, or segments may have gaps between ends. The present patent document is primarily concerned with one-dimensional segmented photosensor arrays, but it is not important whether the ends abut, or whether the ends have gaps.

A picture element (pixel) may be defined as an area on the image being scanned, or as an area on a photosensor array, or as a set of numbers in the data representing an image. For document scanners and transparent film scanners, a pixel is commonly defined as an area on the surface of the document being scanned. For example, for document and transparent film scanners, a common specification is "pixels per inch" (or mm) as measured on the surface of the document being scanned.

For segmented photosensor arrays, alignment of the segments is important. Visually, an error in photosensor position of about one pixel is minor. Therefore, if visual appearance is the only requirement, the segments may be mounted with a spatial accuracy that ensures that actual pixel locations will not deviate from ideal locations by more than about the pitch of the photosensor elements. In some applications, however, precise pixel positioning is needed for reasons other than visual appearance. For example, hand scanners require an operator to manually move a sensor array over an original image, capturing image data in relatively narrow swathes. Image processing software then stitches the various swathes together. Stitching error can result in accumulation of error in the computed position of the scanner on the page. The stitching algorithms may require pixel accuracy to be, for example, less than half the pitch of the photosensor elements.

Placing photosensor array segments over a relatively long length with high precision is technically challenging. High precision adds cost due to the alignment equipment and mounting techniques required, and more importantly, adds cost due to scrapping of photosensor assemblies that do not meet specifications. If the specifications push the state of the art, yield may drop substantially, and relatively small changes in the specification may make significant improvements in yield. There is a need to be able to relax mechanical alignment requirements for photosensor segment alignment, while still providing accurate information needed for image stitching and scanner positioning.

The following discussion provides additional background for a prior art hand held scanner to provide an example of a device where the invention may be used, and to facilitate later discussion of the invention in light of the prior art. A example of a scanning device for which the invention is applicable may be found in U.S. Pat. No. 5,578,813 (Allen '813). Allen '813 describes a hand-held scanner in which a scan-line is defined by the position of a linear array of photosensors. The linear sensor array measures image intensity at uniform positions between the ends of a scan-line. The scan-line may be skewed relative to the sides of the document being scanned and the skew may change as the scanner is moved. In general, the intensity samples measured by the scanner do not fall on a uniform rectangular grid. Separate position sensors monitor the positions of the ends of the scan-line, relative to a starting reference position, as the scanner is moved across the page. Position-tagged intensity data is used to compute image pixels at discrete points on a uniform rectangular pixel grid. The process of transforming a digital image from one set of pixel coordinates to another set of pixel coordinates is called geometric image resampling. Resampling from non-rectangular coordinates to rectangular coordinates is called image rectification.

Ideally, the rectangular pixel grid has grid lines that are parallel to the sides of the document. For example, if a complete image is saved in memory, image analysis may be performed to determine margins, or edges of photographic images, or other information indicating the orientation of the document. Alternatively, the first scan-line may be used to define a reference position and one of two orthogonal directions. All scan-lines after the first may then be resampled to a rectangular grid that is defined relative to the first scan-line. In the following discussion, for convenience of illustration, pixel grids are depicted as square, having the same pitch for each of the two orthogonal directions. Likewise, for convenience of illustration, the optical sampling rate of the scanner along the direction of movement is depicted as the same as the optical sampling rate along the scan-line. In general, however, each of the two orthogonal directions of the pixel grid may have a different pixel pitch. Likewise, the scanner may have one optical sampling rate along the scan-line and a different optical sampling rate orthogonal to the scan line.

FIGS. 1–4 further illustrate prior art hand-held scanning and image resampling. In FIG. 1, a hand-held scanner 100 is manually moved across the surface of a document 102 along a serpentine path 102. FIGS. 2, 3A and 3B illustrate prior art resampling. FIG. 2 illustrates a scan-line 200 with image intensities measured at discrete points 202 along the scan-line. Also illustrated in FIG. 2 is a grid of pixel locations 204. The lines of the pixel grid are ideally parallel to the sides of the document, but may be determined by the first scan-line as discussed above. Separate position sensors (see FIG. 4) are used to measure the relative movement of the ends of the scan-line 200. Given a starting reference position, and given the relative movements of the ends of the scan-line, and given the positions of the measured intensities 202 relative to the ends of the scan-line, the position of each measured intensity 202 may be determined relative to the reference position. The measured intensities 202, and sufficient information to determine the position of each measured intensity 202, may be stored in a memory for later rectification, or rectification may be computed in real time as the intensity data is generated.

FIG. 3A illustrates a series of scan-lines (300, 302, 304, 306) determined by the position of the linear sensor array of the scanner as the scanner is moved across the document being scanned. Each intensity measurement from the scanner sensor array has been assigned a lower-case letter. FIG. 3A also illustrates a grid of pixel locations. The pixel locations have been assigned location notations relative to an arbitrary reference location ($X_0$, $Y_0$). To simplify illustration, in FIG. 3A, each scan-line has five photosensor elements and five intensity measurements. In a typical actual scanner, one linear sensor array may comprise thousands of individual photosensor elements.

FIG. 3B illustrates one example method of computing intensities at the pixel locations from measured intensities from the scanner sensor array. One method for computing image rectification is bilinear interpolation using the intensities of the four closest neighboring sensor values. See, for example, Christopher D. Watkins, et al., *Modern Image Processing: Warping, Morphing, and Classical Techniques,* (Cambridge, Mass., Academic Press, 1993), pp. 99–102. A version of bilinear interpolation, as applied to FIG. 3A, is illustrated in FIG. 3B. In FIG. 3B, the (X,Y) locations of sensor values (d), (e), (i), and (j), and the (X,Y) location of pixel ($X_0+1$, $Y_0+4$) are all known. First, the intensity at point 308 (at $X=X_0+1$) is determined by interpolation between the intensity values for sensor measurements (d) and (i), at the physical locations of sensor measurements (d) and (i). Next, the intensity at point 310 (at $X=X_0+1$) is determined by interpolation between the intensity values for sensor measurements (e) and (j) at the physical locations of sensor measurements (e) and (j). Finally, the intensity at pixel ($X_0+1$, $Y_0+4$) is determined by interpolation at $Y_0$, along $X=X_0+1$, between the intensities at points 308 and 310.

FIG. 4 illustrates a simplified block diagram of a prior art system implementing a hand-held scanner in accordance with FIGS. 1, 2, 3A and 3B. A linear image sensor array 400 measures intensities along a scan-line determined by the position of array 400 on a document being scanned. Position sensors 402 sense the relative movements of the ends of the sensor array 400. A position data system 408 determines relative positions of the end-points of the scan-line. An image data system 406 receives analog intensity measurements from the linear sensor array 400, and uses an analog-to-digital converter to convert the analog image values into numeric image values. A rectification system 408 receives position data from the position data system 404 and numeric image data from the image data system 406 and computes resampled pixel data. The position data system 404 may be a processor or may be specialized electronics. The position data and the image data may or may not be stored in a memory before being sent to the rectification system. Typically, the rectified image data generated by the rectification system is stored in Random Access Memory (RAM).

SUMMARY OF THE INVENTION

During scanner manufacturing, photosensor segment alignment data, such as segment position offset and segment angle, is measured. The offset and angle are stored in non-volatile memory within the scanner. A position correction system uses the stored alignment data to correct position and angle values before being processed by a rectification system. Most pixels require simple geometry calculations. However, a more complex state machine is needed to handle the transition from one photosensor segment to the next. Correcting for segment position offset and angle errors enables a cost reduction for the sensor array and, in particular, reduces costs associated with scrap.

DETAILED DESCRIPTION OF THE PREFERRED EMBODIMENT OF THE INVENTION

Figure 5:
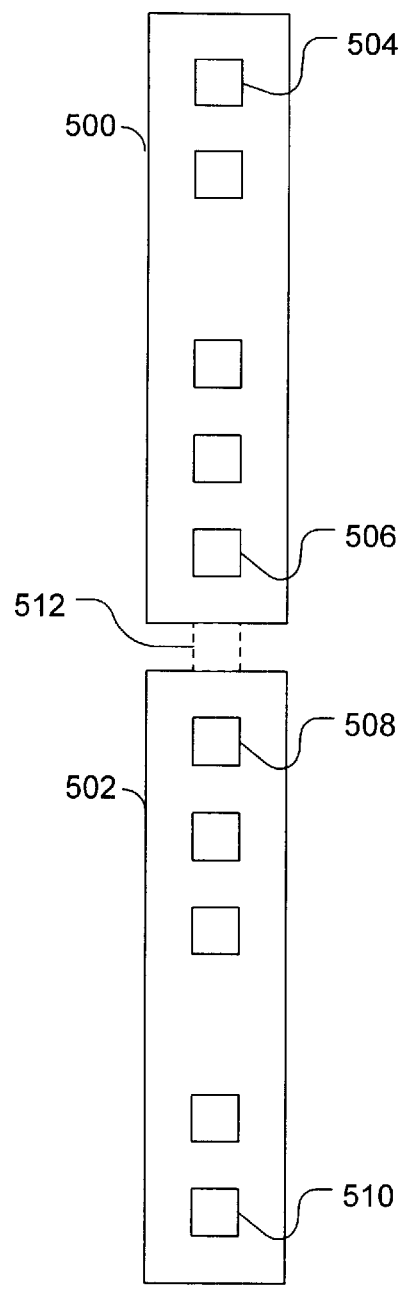
FIG. 5 (prior art) is a block diagram of an example ideal segmented sensor array.

FIG. 5 (prior art) illustrates an example of an ideal segmented sensor array. A first segment 500 has multiple photosensor elements (504–506). A second segment 502 has multiple photosensor elements (508–510). Let segment 500 be segment number one, let element 504 be photosensor element number one for segment number one, and designate a photosensor element as: (segment number, photosensor number). Accordingly, photosensor element 504 is photosensor element (1,1), photosensor element 506 is photosensor element (1,N), photosensor element 508 is photosensor element (2,1) and photosensor element 510 is photosensor element (2,N). In a specific example commercially available segmented sensor array, there are 14 segments, and each segment has 102 photosensor elements.

In the configuration illustrated in FIG. 5, there is a gap between the ends of the segments. Broken square 512 depicts an image area for which light is not captured by the photosensor elements. One simple approach to provide image data for image area 512 is to assign to area 512 the average value of the intensity values measured by photosensor elements (1,N) and (2,1).

Figure 1:
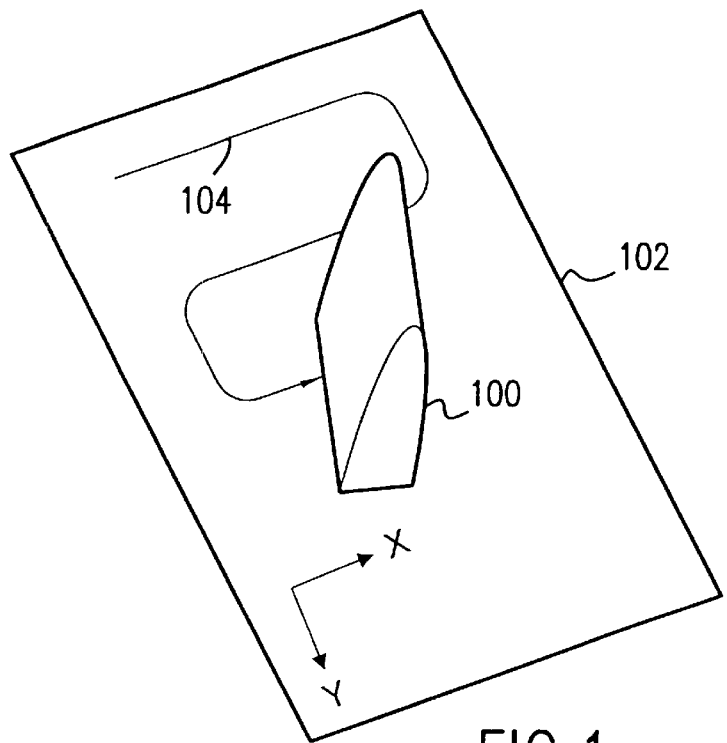
FIG. 1 (prior art) is a perspective view of a hand-held scanner on a document.
Figure 2:
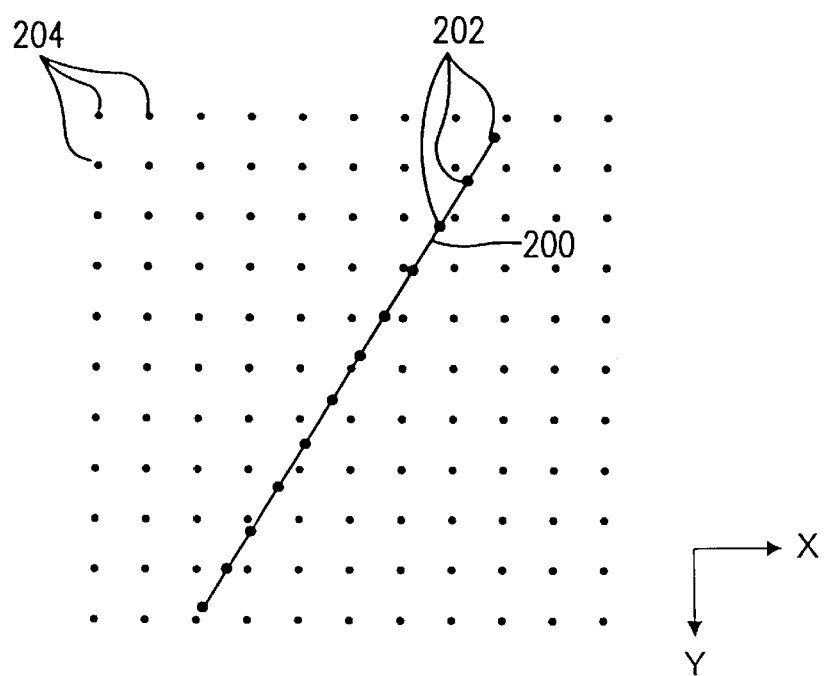
FIG. 2 (prior art) is a plan view of a scan-line on a pixel grid.
Figure 3A:
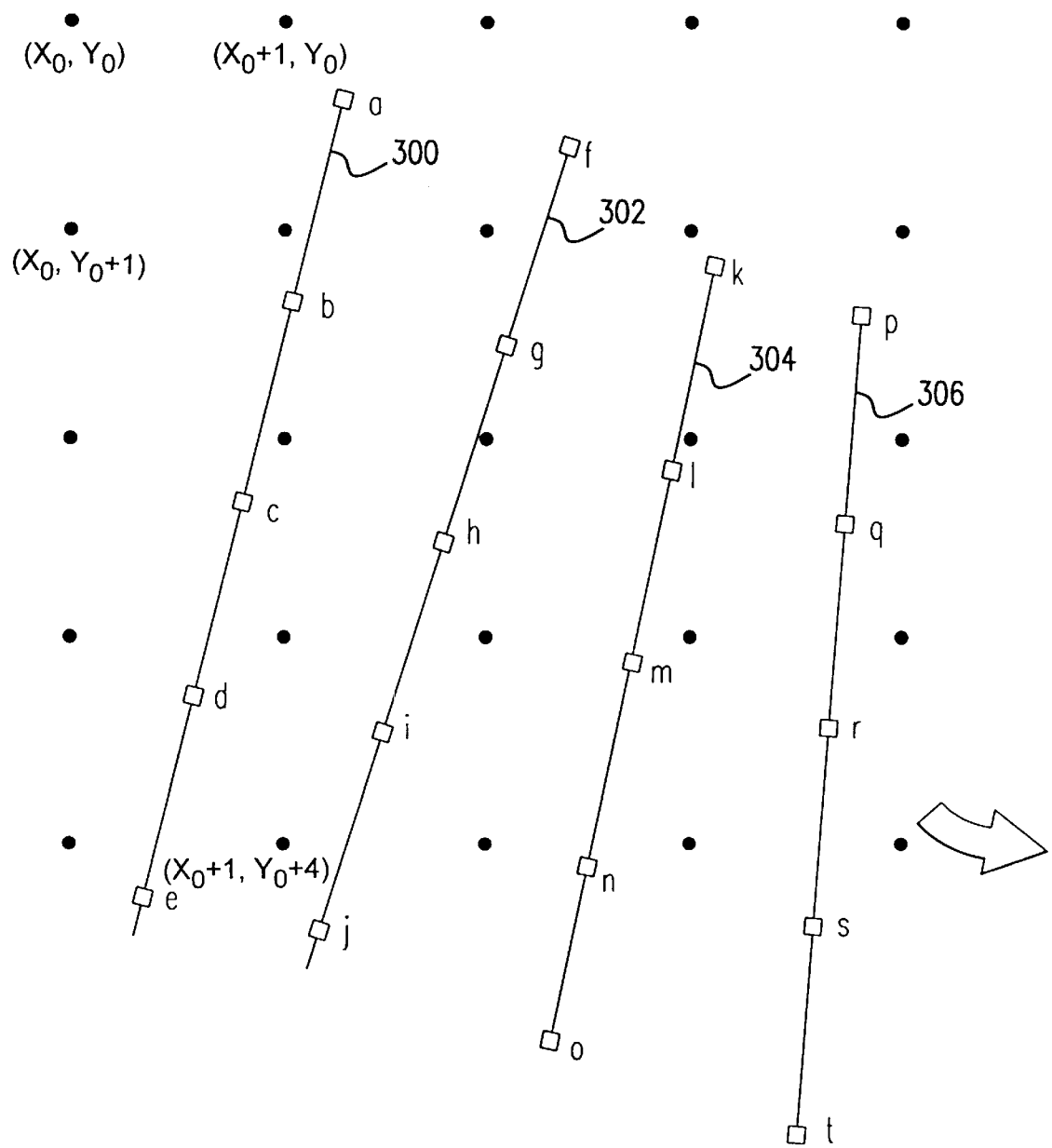
FIG. 3A (prior art) is an expanded view of a pixel grid with multiple scan-lines.

The segmented sensor array in FIG. 5 is assumed to be ideal. Given the (X,Y) position of photosensor (1,1) (where (X,Y) refer to a pixel grid as in FIGS. 2, and 3A), and given the slope of the sensor array in the (X,Y) coordinate space, the (X,Y) position of any photosensor is easily determined from its segment number and photosensor number.

Figure 6A:
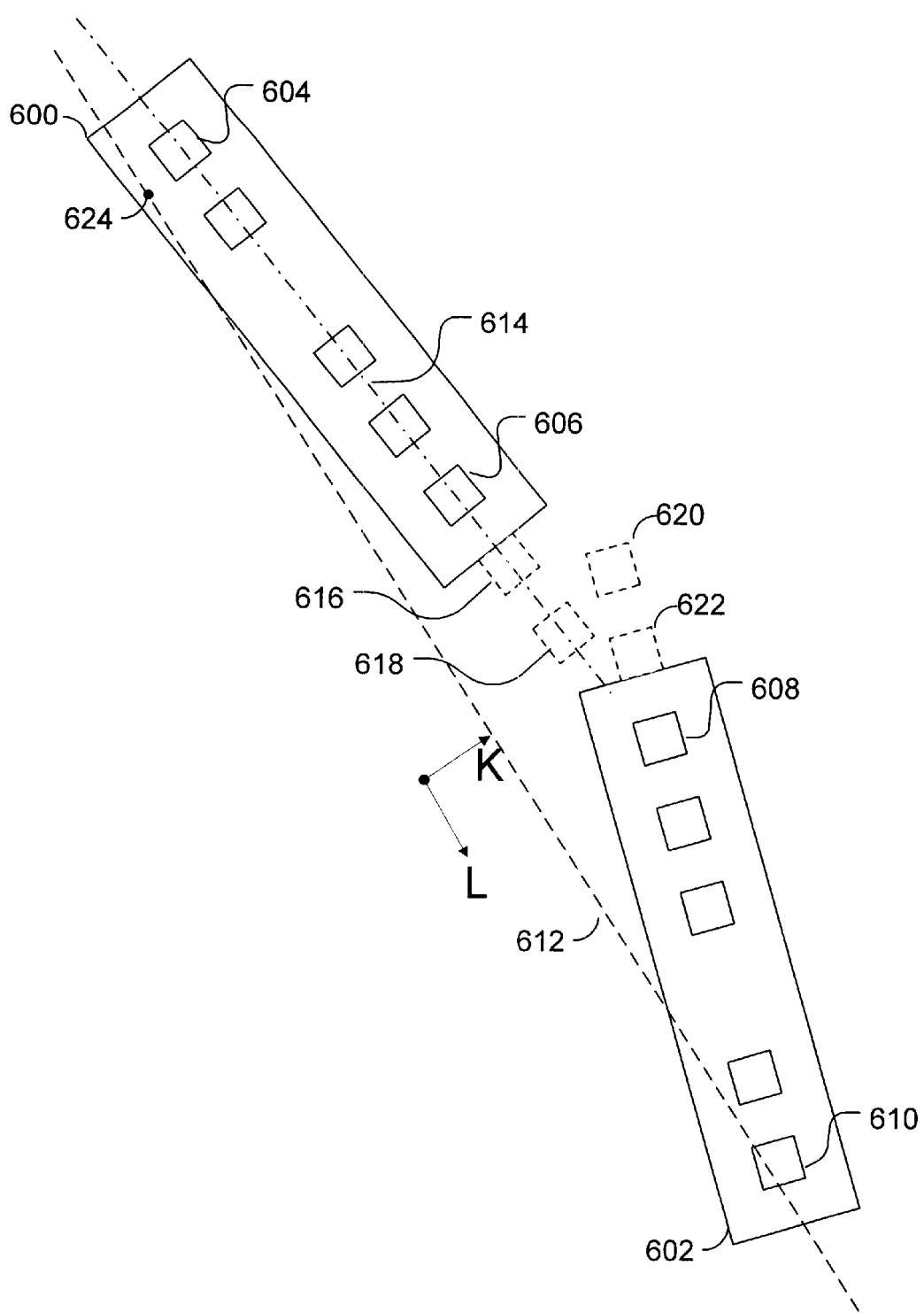
FIG. 6A is a block diagram of a segmented sensor array with imprecise alignment.

FIG. 6A illustrates a segmented array in which the segments are not perfectly aligned. The misalignment is exaggerated in FIG. 6A to facilitate illustration. A first segment 600 has multiple photosensor elements (604–606). A second segment 602 has multiple photosensor elements (608–610). A reference line 612 defines an ideal scan-line. Line 612 may be defined, for example, by connecting the center of the first photosensor element of the first segment to the center of the last photosensor element of the last segment. Alternatively, reference line 612 may be defined statistically, for example, as a least squares fit through the set of all photosensor elements. Given a reference line, direction L is along the reference line, and direction K is perpendicular to the reference line. Line 614 connects the centers of the photosensors of the first segment. That is, line 614 represents the slope of segment 600. Areas 616 and 618 depict image areas, between the first and second segments, resulting from an extrapolation along line 614 of the image areas sensed by the photosensor elements of the first segment (600). Likewise, areas 620 and 622 depict image areas, between the first and second segments, resulting from an extrapolation of the areas sensed by the photosensor elements of the second segment (602). There is an ideal location along reference line 612 for each photosensor element, for example, as if an ideal segmented array, as illustrated in FIG. 5, was aligned along reference line 612. Dot 624 on reference line 612 depicts the ideal location for photosensor element 604. If the segments were perfectly aligned as in FIG. 5, area 620 would be identical to area 606, area 618 would be identical to area 608, and area 616 would be identical to area 622.

In conjunction with the invention, preferably during manufacturing of the scanner, the alignment of each of the segments of the photosensor array is measured, and alignment data is stored in non-volatile memory within the scanner. In an example embodiment of the invention, the photosensor array is used to scan a known calibration target. From the resulting image data, segment offsets and angles are measured. An example of suitable alignment data, for each segment, is as follows.

(1) the distance, $\Delta L$, in the L dimension, between an ideal position and the actual position for the first photosensor of the segment;

(2) the distance, $\Delta K$, in the K dimension, between an ideal position and the actual postion for the first photosensor of the segment;

(3) the slope, (dK/dL), in (K,L) coordinate space of the line connecting the centers of the photosensors in the segment; and (4) a transition bit, one transition bit for each gap between segments, indicating, for example, whether two adjacent ends are more than one pixel apart in the K dimension.

For FIG. 6A, the example alignment data for segment 600 would be: the distance in the L and K dimensions between the ideal position 624 and the actual position of photosensor element 604; the slope in (L,K) coordinate space of line 614; and a transition bit that is not set, indicating that the ends of segments 600 and 602 are not more than one pixel apart in the K dimension.

For an ideal array as in FIG. 5, given the (X,Y) location of the first photosensor element, and $\Delta X$ and $\Delta Y$ (from slope in (X,Y) coordinate space) between photosensor elements, the position of every photosensor element in (X,Y) coordinates requires only addition ($X_{NEW}=X_{OLD}+\Delta X$, $Y_{NEW}=Y_{OLD}+\Delta Y$). For misaligned segments as in FIG. 6A, given the (X,Y) location of the first photosensor element of a particular segment, and $\Delta X$ and $\Delta Y$ between photosensor elements for the particular segment, the position of every photosensor element, in (X,Y) coordinates, in the particular segment, requires only addition. Therefore, a correction system is needed to compute the (X,Y) location of the first photosensor element of each segment, and $\Delta X$ and $\Delta Y$ between photosensor elements for each segment.

Figure 6B:
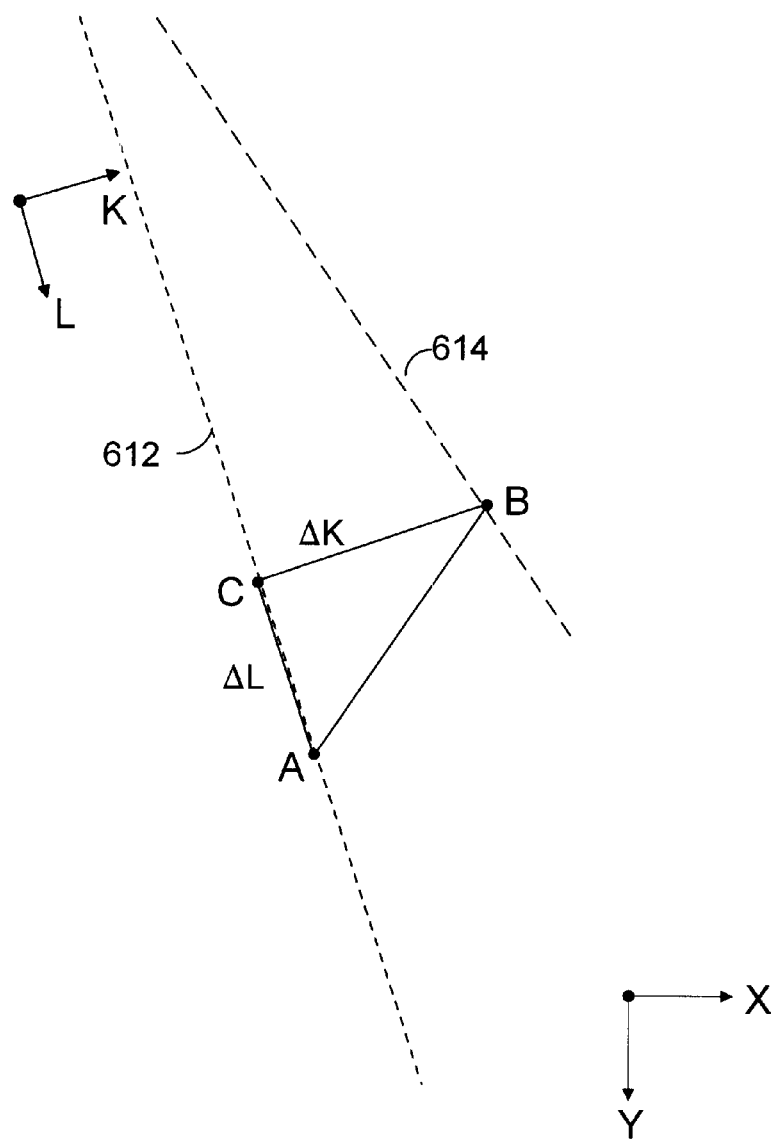
FIG. 6B is a expanded view of part of FIG. 6A illustrating the geometric relationship between an ideal position for a photosensor element and an actual position for a photosensor element.

FIG. 6B is an expanded view of portions of FIG. 6A illustrating the geometry required for computing the (X,Y) location of the first photosensor element of each segment, and $\Delta X$ and $\Delta Y$ between photosensor elements for each segment. In FIG. 6B, lines 612 and 614 are as defined in FIG. 6A. Again, dimension L is parallel to reference line 612, and dimension K is orthogonal to reference line 612. Reference line 612 has a known slope in (X,Y) coordinate space. The (X,Y) coordinates of the ideal position of the first photosensor element of each element may be computed by simple addition as discussed above. Point A is the ideal location for the first photosensor element of a segment, and point B is the actual position. That is, point A is the location of a photosensor element given aligned segments as in FIG. 5. Distance AC and distance CB are known from the calibration data ($\Delta L$ and $\Delta K$, respectively). The (X,Y) position of actual point B is unknown, and must be computed by an error correction system. Line CB is perpendicular to reference line 612. Given the (X,Y) location of point A, the slope of line 612 in (X,Y) coordinate space, and the distance AC ($\Delta L$), the (X,Y) location of point C is determined. Given the (X,Y) location of point C, the slope of line CB in (X,Y) coordinate space, and distance CB ($\Delta K$), the (X,Y) location of point B is determined.

The correction system must also compute the slope of line 614 in (X,Y) coordinate space. More precisely, the correction system must provide $\Delta X$ and $\Delta Y$ values used to incrementally compute the (X,Y) position of each image area. The slope of line 614 relative to line 612 is known from the alignment data. Given the slope of line 612, the slope of line 614 is computed by a simple linear equation, as given below in conjunction with a discussion of FIG. 7. As will be discussed further below, the correction system must also calculate transition image areas between segments.

Figure 4:
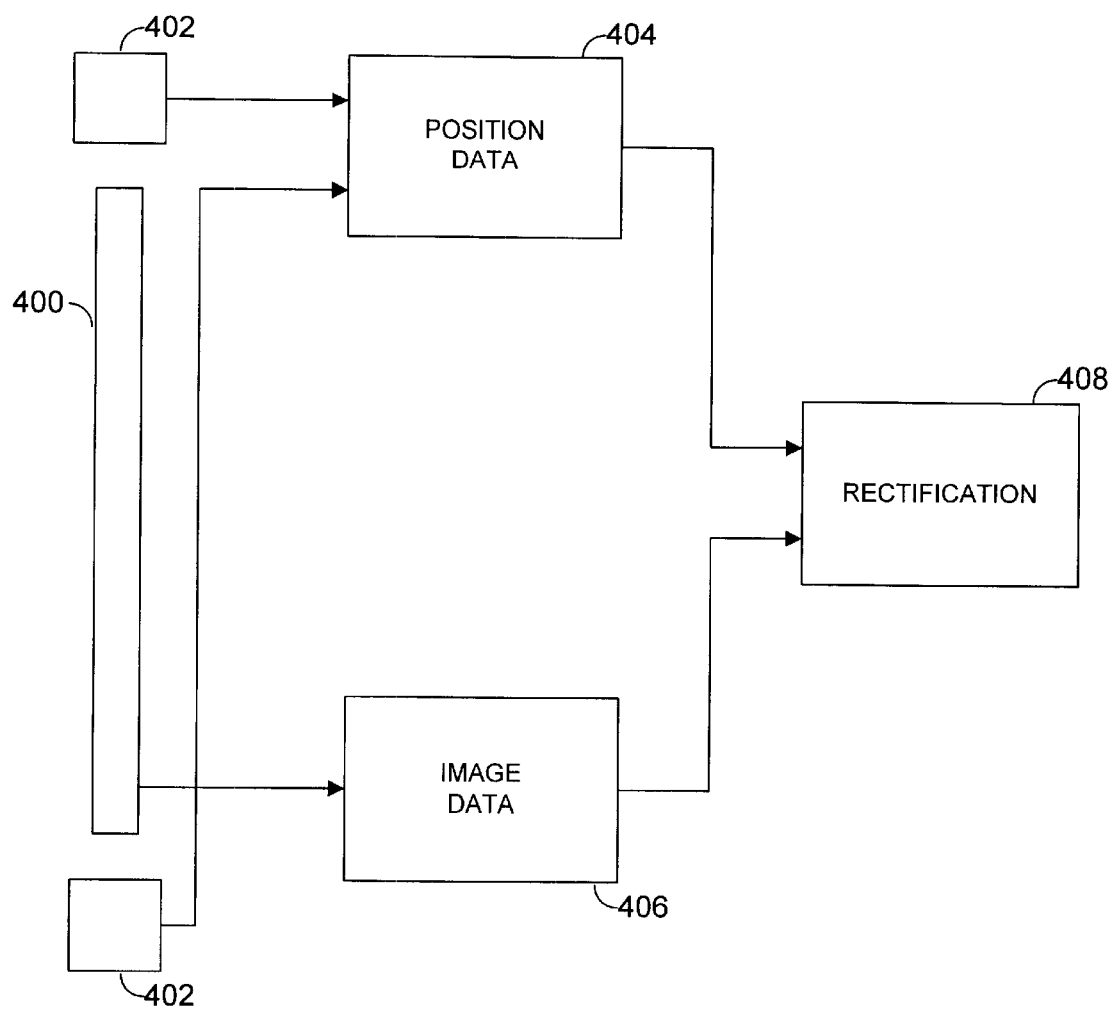
FIG. 4 (prior art) is a simplified block diagram of a hand-held scanner system.
Figure 7:
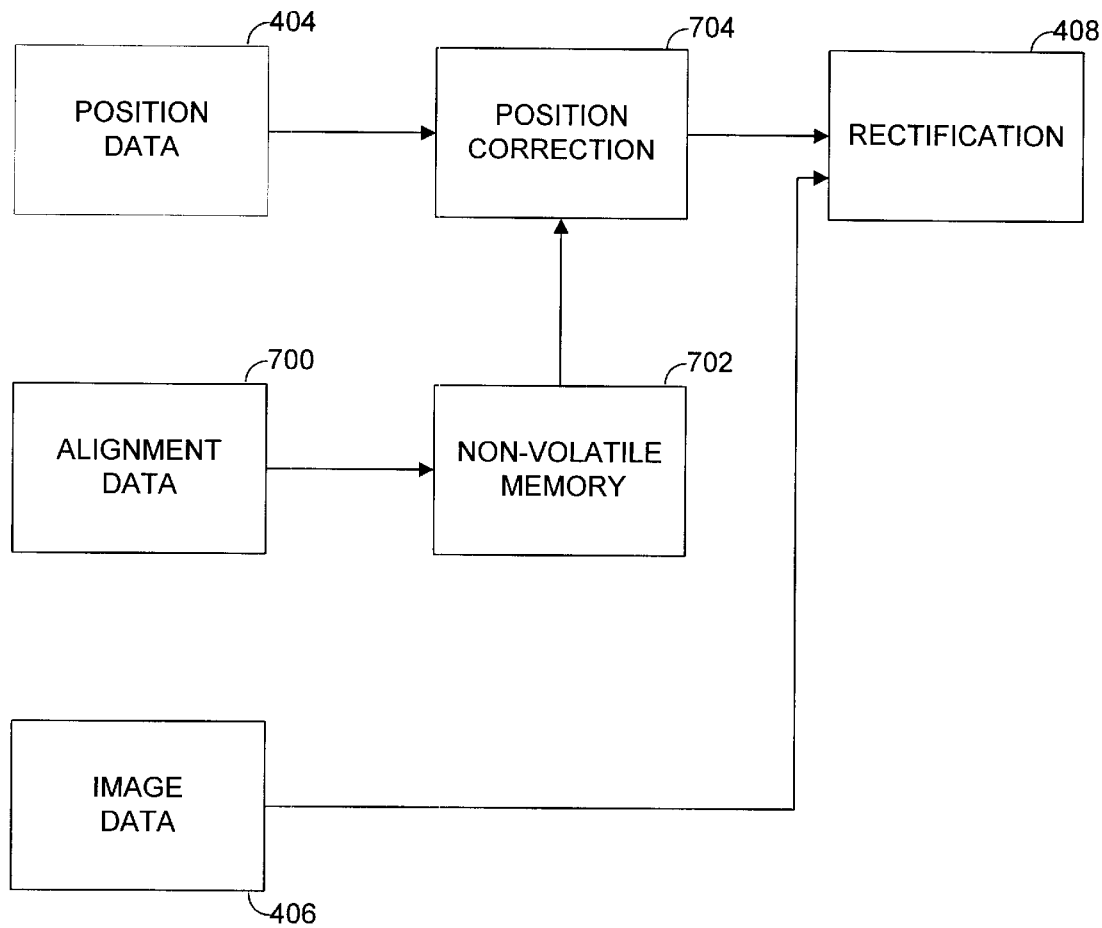
FIG. 7 is a block diagram of part of a scanner system in accordance with an example embodiment of the invention.

FIG. 7 illustrates part of the block diagram of FIG. 4, with example modifications suitable for implementing the invention. In FIG. 7, the position data system 404, the image data system 406, and the rectification system 408, may all be as implemented in FIG. 4. In FIG. 7, alignment data 700, as discussed above, is determined at manufacturing time and saved in a non-volatile memory 702. On a segment by segment basis, position data for the first element of each segment, and the slope of each segment, are then corrected by the error correction system 704 before being sent to the rectification system 408. Although the error correction system 704 and the rectification system 408 are illustrated as two separate functional blocks in FIG. 7, they are preferably physically combined as part of one Application Specific Integrated Circuit (ASIC).

In the prior art system of FIG. 4, the rectification system 408 receives the following position data from the position data system 404.

X(1,M) The X coordinate of the first photosensor of segment M.

Y(1,M) The Y coordinate of the first photosensor of segment M.

dX/dY The slope of the ideal scan-line in the (X,Y) coordinate space.

dX/dL The distance change in X given a distance change of dL in the L dimension.

dY/dL The distance change in Y given a distance change of dL in the L dimension.

In the system of FIG. 7, the error correction system 704 receives the above information, and in addition receives the following information, on a segment-by-segment basis, from the non-volatile memory 702.

ΔL The distance, in the L dimension, of the first photosensor of the segment, from the ideal position.

ΔK The distance, in the K dimension, of the first photosensor of the segment, from the ideal position.

dK/dL The slope of the line connecting the photosensor elements of one segment.

TranBit Transition Bit—a bit used for deciding which data to use for the transition from one segment to the next.

The error correction system 704 then computes the following equations (where S is segment number):

$$X(S, 1)_{ACTUAL} = X(S, 1)_{IDEAL} + \Delta L*(dX/dL) + \Delta K*(dY/dL)$$

$$Y(S, 1)_{ACTUAL} = Y(S, 1)_{IDEAL} + \Delta L*(dY/dL) - \Delta K*(dX/dL)$$

$$dX/dY_{SEGMENT} = dX/dY_{REFERENCE} + (dK/dL)_{SEGMENT} * (dL/dY)_{REFERENCE}$$

The above equations assume that one unit length along K, L, X and Y are all equal (no coordinate scaling). The corrected (X,Y) coordinates of the first element, and the corrected slope in (X,Y) coordinate space, are then sent to the rectification system 408.

Figure 8:
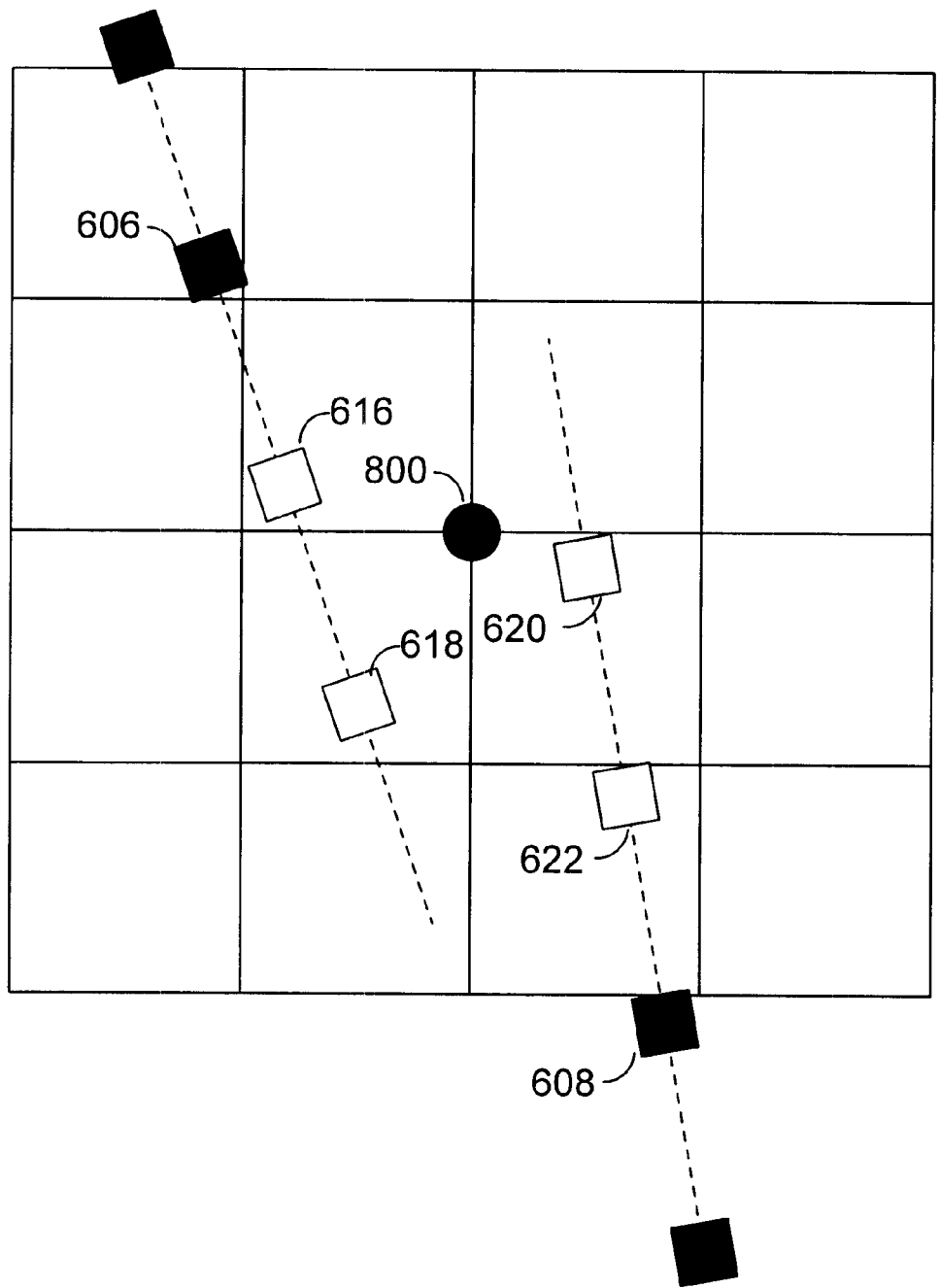
FIG. 8 is an expanded view of a pixel grid with offset segments as in FIG. 6A.

As discussed in conjunction with FIG. 5, the intensity assigned to area 524 may be a average of the intensities measured by photosensors 512 and 514. As illustrated in FIG. 6A, misaligned segments may be shifted in both the L and K dimensions by more than one pixel (where "pixel" in this sense refers to the pitch of the photosensor elements). In FIG. 6A, one could interpolate between the locations determined by the image area defined by photosensor element 606 and the image area defined by photosensor element 608 to compute locations of multiple image areas. However, other approaches have been found to be more suitable for reducing visual artifacts. In the following example method, rather than one intermediate computed area, as depicted in FIG. 5 by area 523, two intermediate computed areas are used, as depicted in FIG. 6A by areas 616 and 618, or areas 620 and 622. FIG. 8 depicts areas 606, 616, 618, 620, 622, and 608 (all from FIG. 6A) on an (X,Y) grid as in FIG. 3A. In FIG. 8, the black squares depict areas corresponding to actual photosensor elements, and the white squares depict extrapolated areas. The black circle 800 depicts an (X,Y) grid point to be used for rectification computation. In the following example method, only two of the computed areas (either 616 and 618, or 620 and 622) will be used for rectification computation.

The rectification system (FIGS. 4 and 7, 408) receives image data (intensity values) and (X,Y) locations (position data) for the intensity values. More precisely, the rectification system 408 receives an integer index value which is used as an index for a list of intensity values, and receives (X,Y) position data for each index value. In the following discussion, the term "average intensity" means the average of the intensity of the last actual area for one segment and the intensity of the first actual area of the next segment. In the system of FIG. 4, for each transition between segments, one computed intensity entry with the average intensity value is inserted and stored as part of the image data 406 being sent to the rectification module 408. Given N actual intensity values per segment, there are N+2 intensity values associated with each segment, numbered zero through (N+1). For one particular segment, an index value of (1) points to the first actual intensity for the segment and an index value of (0) points to an average intensity. For one particular segment, an index value of (N) points to the last actual intensity value of the segment, and an index value of (N+1) points to an average intensity. Element (N+1) for one segment, and element (0) for the next segment, correspond to the same intensity entry in a table of intensity values, but the two computed areas may have different (X,Y) locations, as illustrated in FIG. 8. An algorithm within the position correction system (FIG. 7, 704) decides whether to send to the rectification system (FIG. 7, 408), the (X,Y) locations of areas 616 and 618, or the (X,Y) locations of areas 620 and 622, and which intensity values from the table of intensity values should be assigned to each area.

Figure 9A:
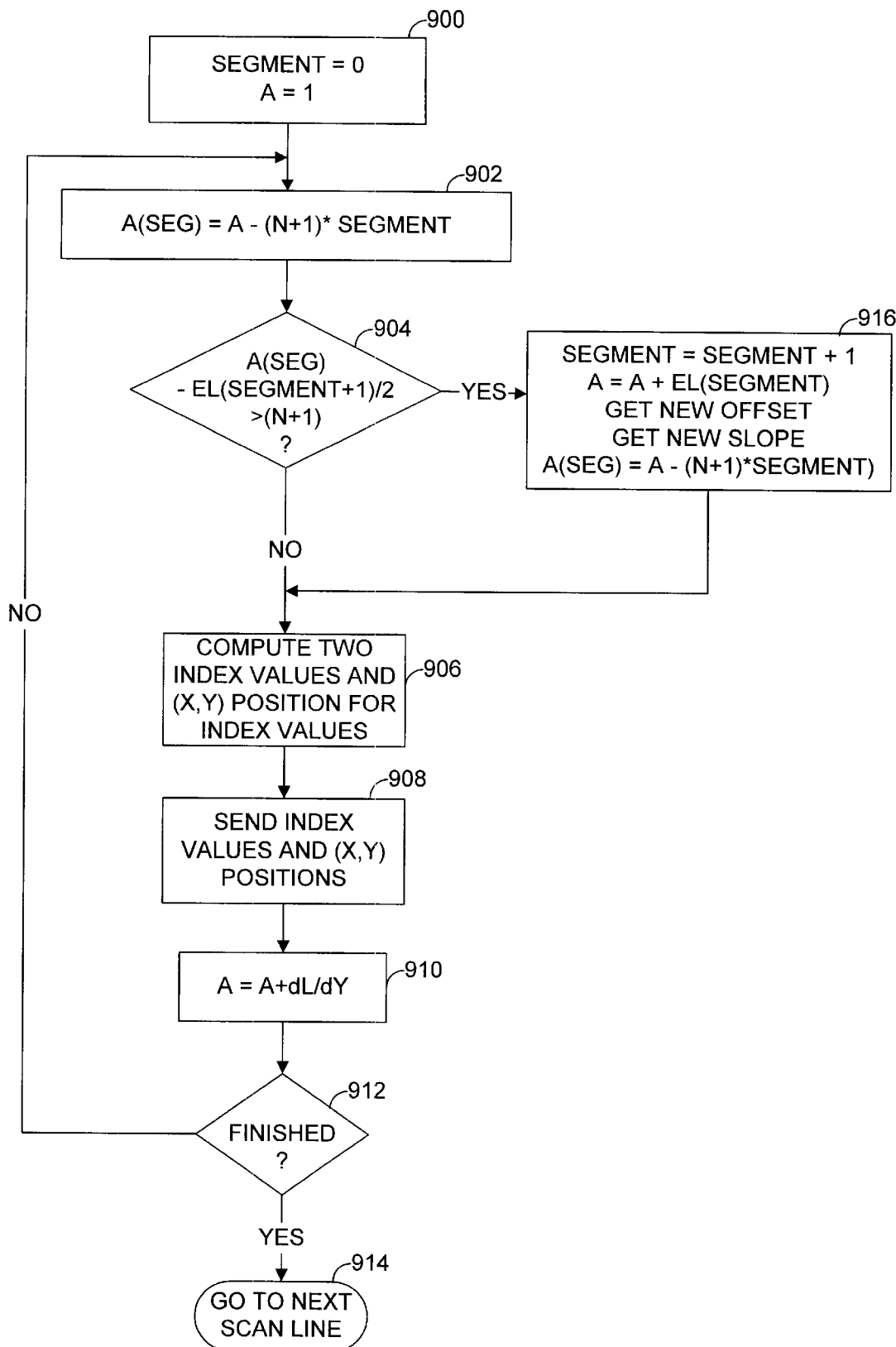
FIG. 9A is a flow chart of method for transition between segments, in accordance with an example embodiment of the invention.

FIG. 9A is an example of an overall method for correcting for segment misalignment, and in particular an example of a method for choosing image areas and intensities during the transition between segments. In the flow chart of FIG. 9A, the following assumptions and definitions are applicable:

There are N photosensor elements per segment.

SEGMENT is an integer segment number.

"EL" is the offset in the L dimension of the first photosensor element of a segment, expressed as a fraction of a pixel (EL=1 indicates an offset of exactly one pixel).

"A" is a position indicator along the length of the array. An integer value of A corresponds to a photosensor number. For example, at the first photosensor of the second segment, A=(N+2).

"A(SEG)" is the variable "A" within a segment (nominal range is 1 to (N+1)).

The transition bit is set (during calibration) if the beginning of one segment is displaced relative to the end of the previous segment, in the K dimension, by at least one pixel.

Figure 3B:
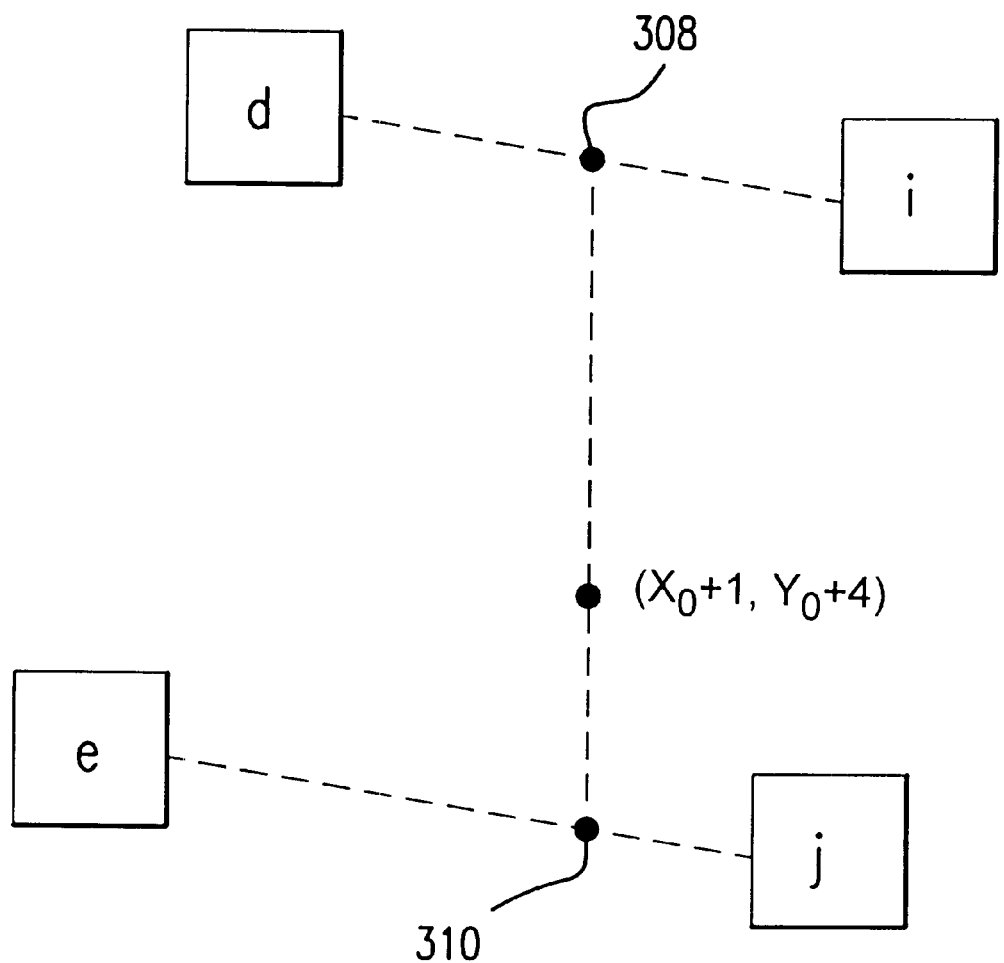
FIG. 3B (prior art) is an expanded view of one point on the pixel grid illustrating bilinear interpolation.

FIG. 9A illustrates an overview for an example method to compute corrected (X,Y) values within segments and to determine appropriate transition pixels between segments. In FIG. 9A, the method progresses in uniform increments in the Y dimension. Variable "A" is incremented by a value (dL/dY) corresponding to the distance moved in the L dimension when Y is incremented from one pixel to the next. Recall from FIG. 3B that the rectification module processes pixel values in pairs (for example, d,e, and i,j). Therefore, each pass through the loop illustrated in FIG. 9A determines two corrected sensor positions for use in rectification. The variable "A" identifies the two pixel values that are appropriate for each value of Y. For example, in FIG. 3B, let photosensor "d" correspond to A=4 and let photosensor "e" correspond to A=5. The variable "A", as used in FIG. 9A, at some point may have, for example, a value of 4.8, indicating that for pixel ($X_0+1$, $Y_0+4$), the two appropriate photosensor values are the fourth and fifth entries in a table or list of intensity values.

At step 900, values for SEGMENT, and "A" are initialized. At step 902, A(SEG) is computed. At decision 904, a decision is made as to whether or not it is time to switch to a new segment. Steps 902 and 904 are discussed in more detail below. If A(SEG) minus half the value of EL for the next segment is greater than (N+1), then the method switches to a new segment (step 916). If, at decision 904, it is time to switch segments, then at step 916, SEGMENT and other segment specific variables are updated. At step 906, the value of (X,Y) for each of the next two photosensor elements is computed (two values are computed). Additional detail for step 906 is provided in FIG. 9B. At step 908, the position correction system (FIG. 7, 704) sends two INDEX values (INDEX1, INDEX2) and two corrected (X,Y) positions to the rectification system (FIG. 7, 408). At step 910, "A" is incremented.

Regarding FIG. 9A, steps 902 and 904, for purposes of illustration, assume that EL for each of two consecutive segments has a magnitude of one (shifted by one pixel). In FIG. 8, a positive EL means that a segment is shifted toward the bottom of the figure. If the segments are perfectly aligned, then the method should switch segments when A(SEG) exceeds (N+1). If the first segment has an EL of positive one, and if the second segment has an EL of positive one, then both segments are shifted, but the spacing in the L dimension between their ends is perfect. At step 904, the segments will be switched when A(SEG) exceeds (N+1). If the first segment has an EL of negative one, and the second segment has an EL of positive one, then the ends of the segments (in the L dimension) are far apart. At step 902, A(SEG) will start at zero. At step 904, there will be no decision to switch segments until A(SEG) exceeds (N+2). Effectively, the decision to switch segments is delayed. If the first segment has an EL of positive one, and if the second segment has an EL of negative one, then the ends of the segments overlap in the Y dimension. At step 904, the segments will be switched when A(SEG) exceeds (N). Effectively, the decision to switch segments is made early.

Figure 9B:
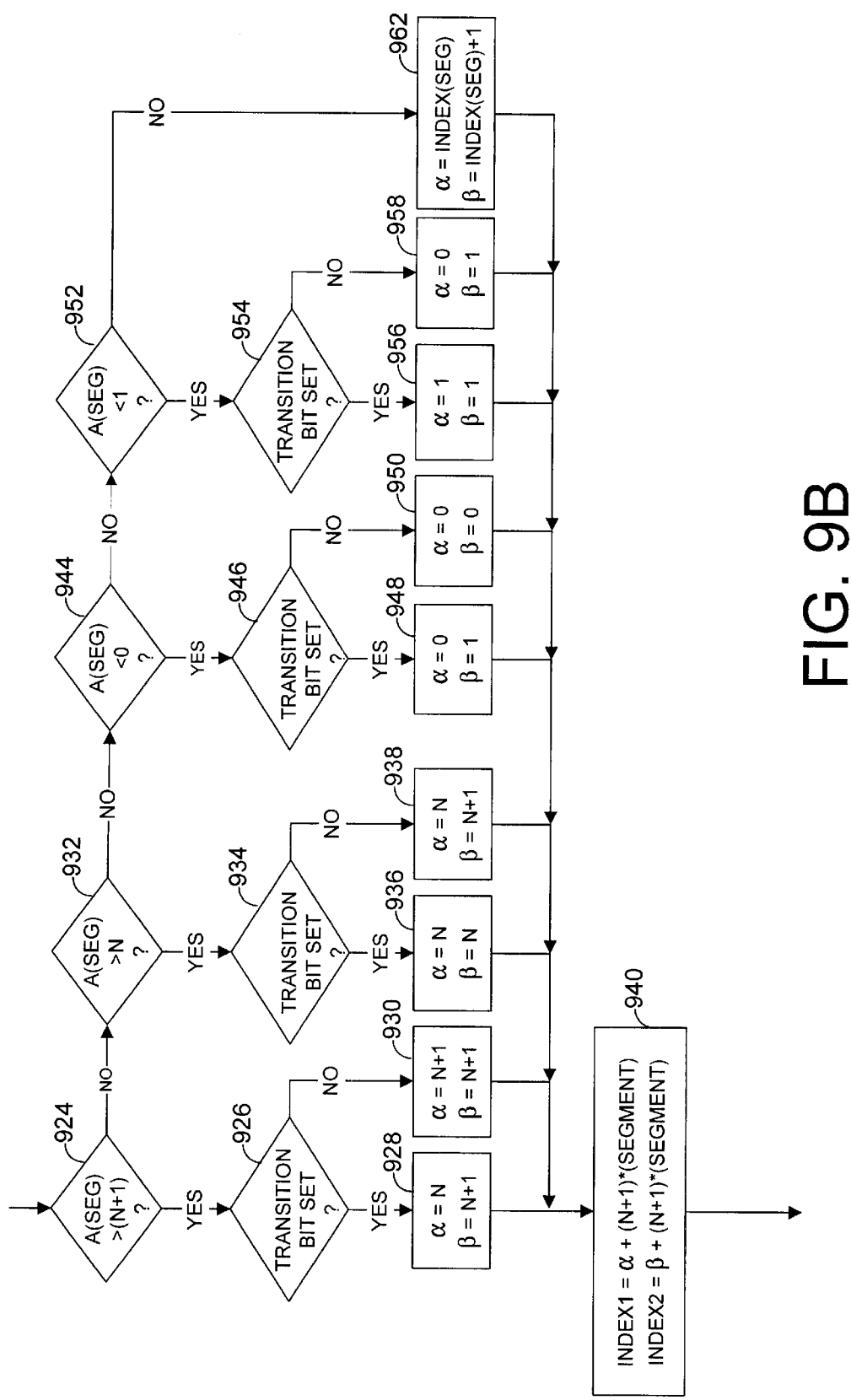
FIG. 9B is a flow chart illustrating additional detail for part of the method of FIG. 9A.

FIG. 9B provides more detail for step 906 in FIG. 9A. If the process is not in a transition zone, then index values are selected in step 962. If the process is in a transition zone, and if the end of an old segment is extrapolated into the transition zone, then index values are specified in steps 928, 930, 936 or 938. If the process is in a transition zone, and if the beginning of a new segment is extrapolated, then index values are specified in steps 948, 950, 956, or 958.

For purposes of illustration of transition, consider two examples. For the first example, assume a first segment has an EL of negative one, and a second segment has an EL of positive one (the ends of the segments are far apart in the L dimension). A(SEG) will equal N+2 when the decision is made to switch segments. The positions of the two transition elements are extrapolated from the first segment (FIG. 8, elements 616 and 618). If the transition bit is set, the ends are far apart both in the L dimension and in the K dimension. This is approximately the situation illustrated in FIG. 8, where the ends are far apart in the L dimension (elements 616 and 622 should be aligned in the L dimension) and in the K dimension (elements 606 and 608 should be aligned in the K dimension). However, for the transition bit to be set, elements 620, 622 and 608 should be even further to the right. If the transition bit is set, it is reasonable to increase the contribution of element 606, so the intensity of real element 606 is used for computed element 616 and the average intensity value is used for computed element 618 (FIG. 9B, step 928). If the transition bit is not set, then it is reasonable to balance the contribution of elements 606 and 608, so the average intensity is used for elements 616 and 618 (FIG. 9B, step 930).

For the second example, assume a first segment has an EL of one, and a second segment has an EL of negative one (the ends overlap in the L dimension). The positions of the two transition elements are extrapolated from the second segment (FIG. 8, elements 620 and 622). If the transition bit is set, then it is reasonable to increase the contribution of real element 608 (FIG. 8), so the intensity of real element 608 is used for computed element 622, and the average intensity is used for element 620 (FIG. 9B, step 948). If the transition bit is not set, then it is reasonable to balance the contribution of elements 606 and 608, and the average intensity value is used for elements 620 and 622 (FIG. 9B, step 950).

In FIG. 9B, if A(SEG) is greater than (N+1) (decision 924), or if A(SEG) is greater then (N) (decision 932), then two computed areas are extrapolated from the previous segment (step 940). If A(SEG) is greater than (N+1) and if the transition bit is set (decision 926), then in step 928, the first extrapolated area is assigned the intensity of the last actual area (N), and the second extrapolated area is assigned the average intensity. If the transition bit is not set (decision 926), then in step 930 both the first and second extrapolated areas are assigned the average intensity.

If A(SEG) is less than (N+1) but greater than N, and if the transition bit is set (decision 934), then in step 936, both the first and second extrapolated areas are assigned the intensity of the last actual area of the previous segment. If the transition bit is not set (decision 934), then in step 938 the first extrapolated area is assigned the intensity of the last actual area of the previous segment, and the second extrapolated area is assigned the average intensity.

If A(SEG) is less than zero (decision 944), or if A(SEG) is less than one (decision 952), then two computed areas are extrapolated from the new segment. If A(SEG) is less than zero, and the transition bit is set (decision 946), then at step 948 the first extrapolated area is assigned the average intensity, and the second extrapolated area is assigned the intensity of the first actual area of the new segment. If the transition bit is not set (decision 946), then both extrapolated areas are assigned the average intensity.

If A(SEG) is greater than zero but less than one (decision 952), and if the transition bit is set (decision 954), then at step 956 both extrapolated areas are assigned the intensity of the first actual area of the new segment. If the transition bit is not set (decision 954) then at step 958 the first extrapolated area is assigned the average intensity, and the second extrapolated area is assigned the intensity of the first actual area of the new segment. If A(SEG) is greater than or equal to one and less than or equal to N, then the process is not in a transition zone and index values are specified by step 962.

The system described above is just one example of correcting for misaligned segments. Given one large ASIC or one processor, the characterization of the error correction system as a separate entity, or the characterization of the position data system as a separate entity, is only to facilitate explanation of functions. Instead of having a correction system that receives assumed ideal positions from a position data system and then correcting them, the alignment data could be presented directly to the position data system and the position data system could provide corrected data directly to a rectification system. Alternatively, a correction system could receive raw data from the position sensors, and send corrected data to the position data system. In addition, there are many alternative ways of measuring misalignment and solving the basic geometry problems to correct for misalignment. For example, instead of measuring the offset of the first photosensor element and slope, the offset of the first and last photosensor elements of each segment could be measured. Instead of measuring the offset of one or both ends of a segment, the offset of every photosensor element could be measured. Finally, the use of a transition bit, and the criteria for setting the transition bit, is just one example of an algorithm for selecting transition pixel intensities.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image scanner, comprising:

a photosenor array, the photosensor array further comprising a plurality of segments;

a memory that is non-volatile, containing alignment data representing alignment of the segments;

position sensors, measuring a position of the photosensor array; and a position correction system, receiving position data derived from the position sensors, receiving alignment data from the memory, and generating corrected position data.

2. The image scanner of claim 1, further comprising:

each segment further comprising a plurality of photosensor elements, each segment having a first photosensor element within the plurality of photosensor elements;

the alignment data specifying the alignment of the first photosensor element of each segment.

3. The image scanner of claim 2, further comprising:

the alignment data specifying the slope of each segment.

4. The image scanner of claim 1, further comprising:

a rectification system, the position correction system sending corrected position data to the rectification system.

5. The image scanner of claim 1, further comprising:

a position data system, the position data system receiving position signals from the position sensors and generating position data; and the position correction system receiving position data from the position data system and generating corrected position data.

6. The image scanner of claim 5, further comprising:

a rectification system, the position correction system sending corrected position data to the rectification system.

7. A method, in an image scanner having a photosensor array comprised of a plurality of segments, of compensating for misalignment of the segments, the method comprising the following steps:

receiving, by a position correction system, position data;

receiving, by the position correction system, alignment data for each segment; and generating, by the position correction system, corrected position data.

8. The method of claim 7, further comprising:

receiving, by the position correction system, position offset data for a first photosensor element of each segment.

9. The method of claim 8, further comprising:

receiving, by the position correction system, slope offset data for each segment.

10. The method of claim 7, further comprising:

sending, by the position correction system, corrected position data to a rectification system.

* * * * *